May 19, 1942.    M. L. BOLING    2,283,785
WIRING SYSTEM FOR MOTOR VEHICLES
Filed June 26, 1939
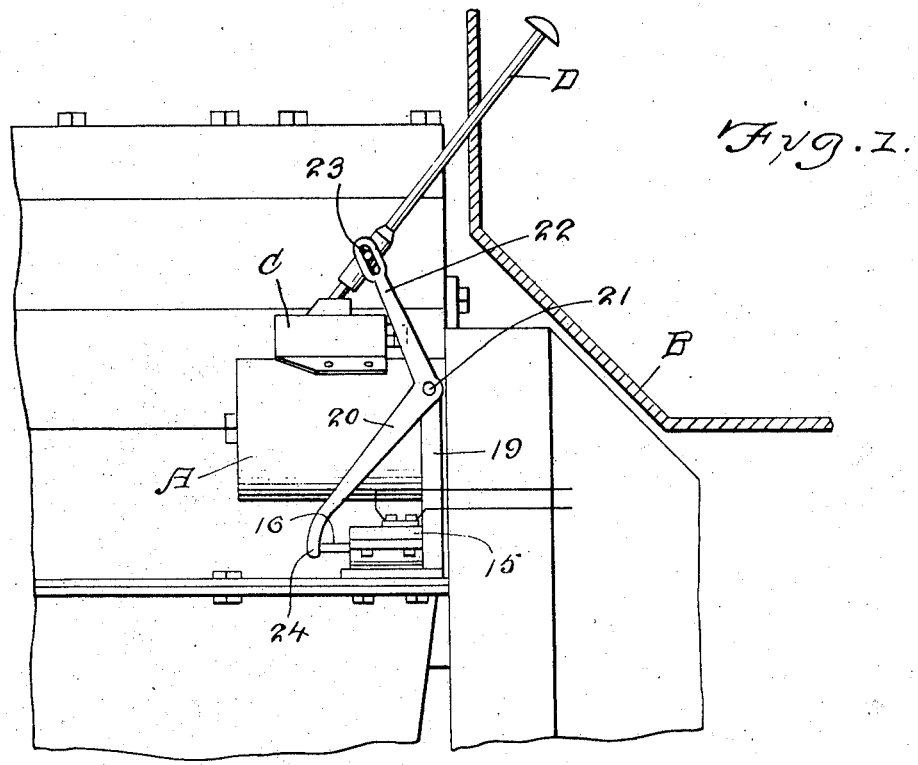
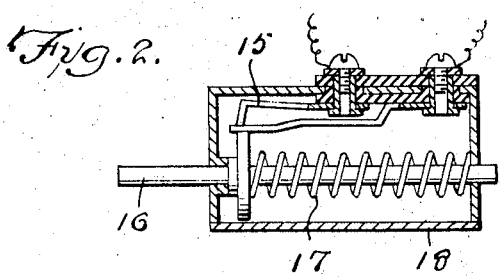
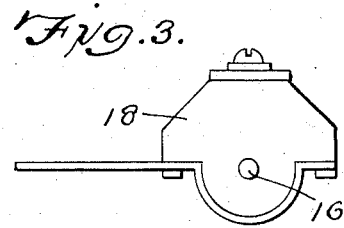
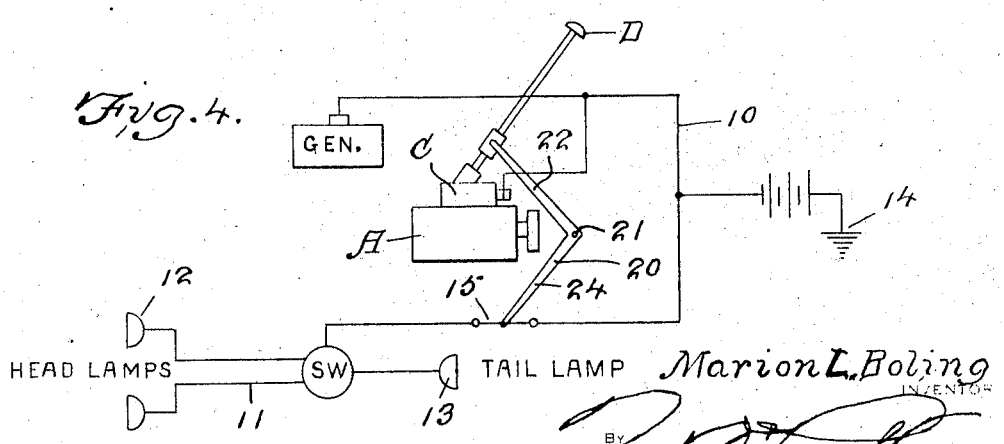
Marion L. Boling
INVENTOR
BY
ATTORNEYS
WITNESS Patented May 19, 1942

2,283,785

UNITED STATES PATENT OFFICE 2,283,785

WIRING SYSTEM FOR MOTOR VEHICLES

Marion L. Boling, Hollywood, Calif.

Application June 26, 1939, Serial No. 281,296

3 Claims. (Cl. 171—97)

The invention relates to an electric control system for motor vehicles and more especially to an automatic cut-off for the lighting equipment of motor vehicles.

The primary object of the invention is the provision of a control of this character, wherein on operating the starter switch installed in a motor vehicle, if the lights thereof be on, the same will be shut off until the motor starts and in this way relieve the storage battery from the electric load that will have been imposed should the lights remain on during the starting of the motor.

Another object of the invention is the provision of a control of this character wherein attention on the part of the operator of a motor vehicle to the lights when turned on at the time of the starting of the motor will not be required in that the said lights when the motor starter switch is operated will be extinguished automatically, thus relieving the battery from this load as would be the case should the motor be started and the lights on and in this fashion the battery will not be unduly weakened through a double strain of current consumption.

A further object of the invention is the provision of a control of this character, wherein there is not required any material change in the standard equipment, that is to say the wiring system for lighting and starting of the vehicle, the control being automatic in its working, requiring no attention on the part of the user of the vehicle and coacts with the starter motor of the said vehicle to effect the simultaneous extinguishing of the lights during the starter operating period.

A still further object of the invention is the provision of a control of this character which is simple in its construction, thoroughly reliable and efficient in operation, automatic in the working thereof, requiring little or no attention, and inexpensive to manufacture and install.

With these and other objects in view, the invention consists in the features of construction, combination, and arrangement of parts as will be hereinafter more fully described in detail, illustrated in the accompanying drawing which discloses the preferred embodiment in the invention, and pointed out in the claims hereunto appended.

In the accompanying drawing:

Figure 1 is a fragmentary vertical longitudinal sectional view through a motor vehicle showing a portion of its motor and starter mechanism in side elevation with the control constructed in accordance with the invention applied.

Figure 2 is a vertical longitudinal sectional view through the control per se.

Figure 3 is an end elevation thereof.

Figure 4 is a diagrammatic plan view of the wiring system and the control in association therewith under installation in a motor vehicle.

Similar reference characters indicate corresponding parts throughout the several views in the drawing.

Referring to the drawing in detail, A designates generally an electric starter motor for a motor vehicle, a portion thereof being indicated at B, and this motor is controlled through switch mechanism generally indicated at C operated from a push plunger D, being either hand or foot operated. This motor A is arranged in electric circuit 10 which includes wiring 11 for the lighting equipment, namely the head lamps 12 and tail-light 13 or any other lighting equipment required for service in the motor vehicle. The circuit 10 is in hook-up with a storage battery indicated at 14.

In the circuit 10 is a switch 15 adapted to be opened and closed by a plunger 16, the latter acted upon by coiled expansion springs 17 within housing 18 for the said switch 15 so that normally this switch 15 will be in a closed position and thus when the usual hand switch is closed for the lighting of the motor vehicle, the lights will be on. Bracketed at 19 is a bellcrank lever 20, being pivoted at 21 and its arm 22 has loose connection at 23 with the plunger D for the starter switch while the terminal 24 of the other arm of said lever 20 operated upon the plunger 16 so that when the plunger D is depressed, the lever 20 will be moved automatically actuating the plunger 16 to effect the automatic opening of the switch 15 and thereby extinguishing the lights of the vehicle during the period of starter operation. In this manner, the battery 14 is relieved of the dual strain or the loads imposed thereon when the lights are lighted and the starter motor A operated. In other words, when the starter motor A is operated for the starting of the motor vehicle and the lights of said vehicle are on, these will be extinguished by the opening of the switch 15 automatically and thereby reducing the current load as would be imposed thereby upon the battery. When the starter motor A becomes passive, then the switch 15 automatically closes bringing the lights again on so that at no time when starting the motor will the battery be imposed upon by the current required for the lighting of the vehicle during the starting period of operation.

The pivot 21 is carried by the bracket 19 for the lever 20.

From the foregoing, it is thought that the construction and manner of operation of the control will be clearly understood and therefore a more extended explanation has been omitted.

Changes, variations and modifications in the invention are contemplated as fall properly within the scope of the appended claims.

What is claimed is:

1. In combination with an electric lighting system of a motor vehicle and an electric starter having a manually actuated operating means, a self closing switch for said electric lighting system, and means actuated by said first-mentioned means for operating the switch to render the lighting system inoperative at the time of operation of the starter.

2. In combination with an electric lighting system of a motor vehicle and an electric starter having a manually actuated operating means, self opening contacts electrically connected in said electric lighting system for rendering the system inoperative, a spring influenced plunger for sustaining the contacts closed to render the system operative, and means actuated by said first-mentioned means for actuating the plunger into a position for freeing the contacts to render the electric lighting system inoperative during the time of operation of the starter.

3. In combination with an electric lighting system of a motor vehicle and an electric starter having a manually actuated operating means, self opening contacts electrically connected in said electric lighting system for rendering the system inoperative, a spring influenced plunger for sustaining the contacts closed to render the system operative, and a pivoted lever connected to said first-mentioned means and engaging said plunger to position the latter to free the contacts and thereby render the lighting system inoperative during the time of operation of said starter.

MARION L. BOLING.